(12) United States Patent
Stagg et al.

(10) Patent No.: US 6,681,585 B1
(45) Date of Patent: Jan. 27, 2004

(54) LIQUID DISPENSER WITH SELF-FILLING CONTAINER

(75) Inventors: Michael E. Stagg, Evansville, IN (US); Susan R. Keil, Evansville, IN (US); Travis M. Perkins, Evansville, IN (US); Donald E. Janke, Benton Harbor, MI (US); Rhonda K. Hendrickson-Orman, Newburgh, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/349,825

(22) Filed: Jan. 23, 2003

(51) Int. Cl.$^7$ ............................................... F25D 17/00
(52) U.S. Cl. ......................................... 62/177; 62/389
(58) Field of Search ................... 62/177, 389; 222/64, 222/67

(56) References Cited

U.S. PATENT DOCUMENTS

| | | | |
|---|---|---|---|
| 1,890,461 A | 12/1932 | Hamburg | |
| 1,936,517 A | 11/1933 | Maine | 62/38 |
| 2,096,481 A | 10/1937 | Frykdahl | 62/46 |
| 2,401,613 A | 9/1946 | Charland | 62/89 |
| 3,830,406 A | 8/1974 | Robb | 222/143 |
| 5,490,547 A | 2/1996 | Abadi et al. | 141/359 |
| 5,551,598 A * | 9/1996 | Custinger | 222/52 |
| 5,901,879 A * | 5/1999 | Duhaime et al. | 222/1 |
| 5,941,417 A * | 8/1999 | Anderson et al. | 222/64 |
| 6,474,862 B2 * | 11/2002 | Farrell | 366/147 |

* cited by examiner

*Primary Examiner*—Melvin Jones
(74) *Attorney, Agent, or Firm*—Stephen Krefman; Robert O. Rice; John F. Colligan

(57) ABSTRACT

A liquid dispenser and self-filling container system, including a liquid supply line, a liquid container, a liquid dispenser positioned to deliver a supply of liquid to the container from the liquid supply line, a valve positioned in the liquid supply line to selectively deliver liquid to the liquid dispenser, an optical sensor positioned relative to the liquid container to detect the presence of the container and a level of liquid in the container, and a control circuit connecting the optical sensor and the valve to open the valve when the sensor detects the presence of the container and a level of liquid below a maximum desired liquid level in the container and to close the valve when the sensor detects at least one of the absence of the container and a maximum desired liquid level in said container. Such a liquid dispenser may be a water dispenser in a refrigerator.

19 Claims, 3 Drawing Sheets

LIQUID DISPENSER WITH SELF-FILLING CONTAINER

BACKGROUND OF THE INVENTION

The present invention relates generally to water dispensers and also to water dispensers associated with refrigerators.

Various types of liquid dispensing systems are known including those which dispense liquids into removable containers. Typically such systems require either a manual filling of the container or a number of mechanical switches in order to effectuate an automatic filling of the container.

For example, in U.S. Pat. No. 5,490,547 which provides a container to be automatically filled with water in a refrigerator, a mechanical switch is used to detect the presence of the container, a deflection switch is used to measure the amount of water in the container and a third switch is utilized to detect whether the door of the refrigerator is open or closed.

SUMMARY OF THE INVENTION

The invention provides a liquid dispenser and self-filling container system which utilizes an optical sensor to detect the presence of the container as well as a level of liquid in the container. The system would also include a liquid supply line and a liquid container, a liquid dispenser positioned to deliver a supply of liquid to the container from the liquid supply line and a valve positioned in the liquid supply line to selectively deliver liquid to the liquid dispenser. A control circuit is provided connecting the optical sensor to the valve to open the valve when the sensor detects the presence of the container and a level of liquid below a maximum desired liquid level in the container and to close the valve when the sensor detects at least one of the absence of the container and a maximum desired liquid level in the container.

In an embodiment of the invention, a system is provided for providing a supply of chilled liquid which comprises a refrigerator cabinet having a refrigerated storage area and a door for accessing the refrigerated storage area, a serving vessel removably located within the refrigerated storage area, an optical sensor positioned relative to the serving vessel to detect the presence of the vessel and a level of liquid in the vessel, and a fluid supply system providing the liquid to the serving vessel via a dispenser located in the storage area in response to an output from the optical sensor.

In an embodiment, the optical sensor comprises a light emitting diode and a light receiving device located outside of the container and a reflector located inside of the container.

In an embodiment of the invention, the reflector comprises a prism with reflecting surfaces positioned at a level associated with a maximum desired liquid level in the container or vessel.

In an embodiment of the invention, a control circuit includes a timer device to permit an opening of the valve for only a pre-determined length of time.

In an embodiment of the invention a liquid dispenser and self-filling container system are provided which comprise a liquid supply line, a liquid container, a liquid dispenser positioned to deliver a supply of liquid to said container from said liquid supply line and a valve positioned in the liquid supply line to selectively deliver liquid to the liquid dispenser. One or more sensors are positioned relative to the container to detect the presence of the container and a level of liquid in the container. Also, a control circuit is provided which connects the one or more sensors and the valve to open the valve when at least one of the sensors detects the presence of the container and a level of liquid below a maximum desired liquid level in the container and to close the valve when at least one of the sensors detects at least one of the absence of the container and a maximum of desired liquid level in the container, and wherein the control circuit includes a timer device to permit an opening of the valve for only a predetermined length of time.

DETAILED DESCRIPTION OF THE PREFERRED EMBODIMENT

Figure 1:
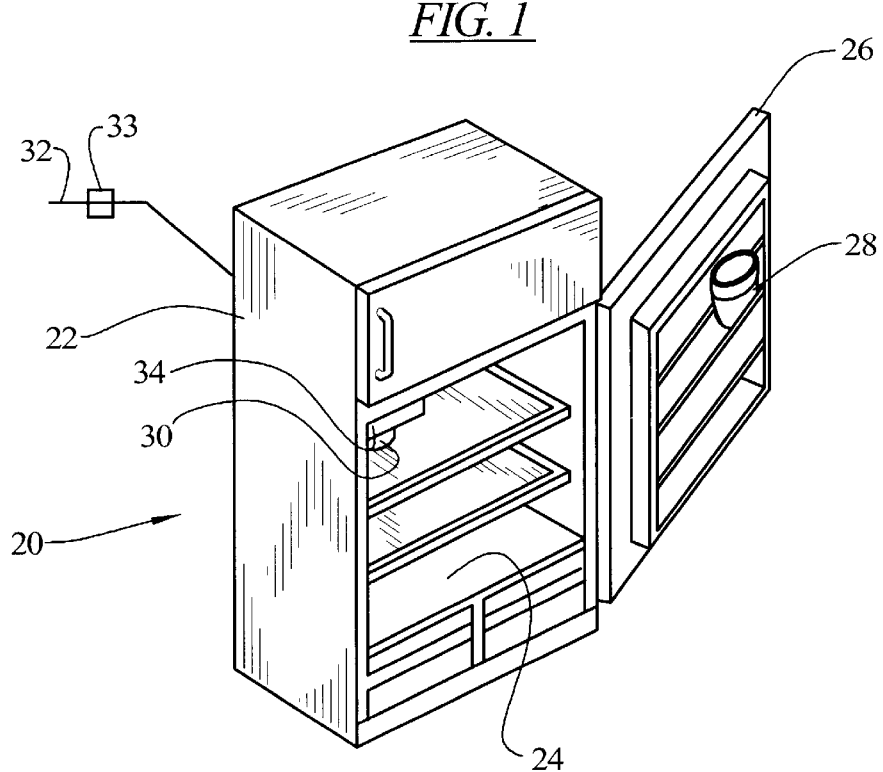
FIG. 1 is a perspective view of a refrigerator in which the present invention may by utilized.
Figure 2:
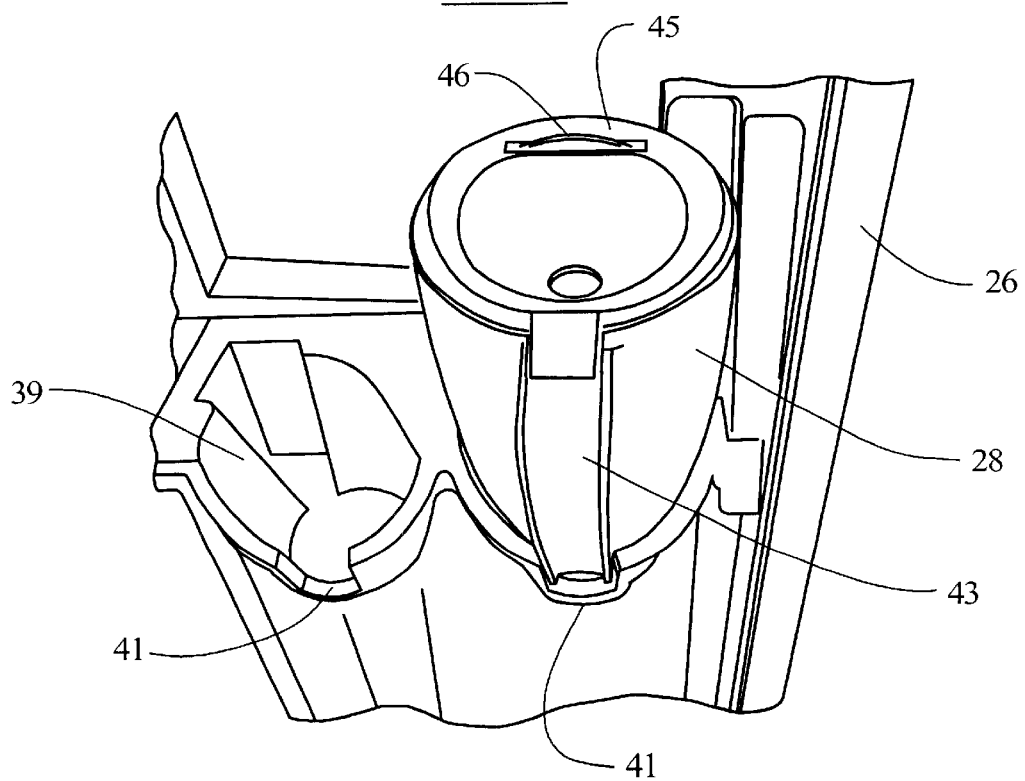
FIG. 2 is a top rear perspective view of a container held in a receptacle.
Figure 3:
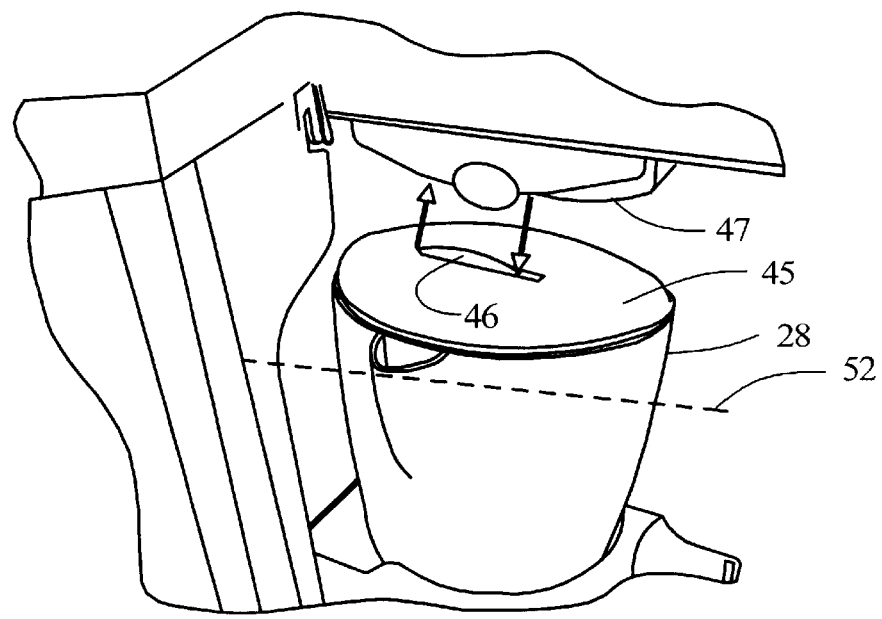
FIG. 3 is a top front perspective view of a container held in a receptacle below a dispenser.

The invention provides a liquid dispenser and self-filling container system which utilizes an optical sensor to detect the presence of the container as well as a level of liquid in the container. While such a system could be used for a wide variety of liquids, and in a wide variety of appliances or other devices, a particular embodiment of the invention is illustrated in FIG. 1 in which the invention is used in combination with a refrigerator 20. It should be understood that the invention is not limited to such a particular environment or use, and could be used for dispensing water into a container for non-refrigerated storage, or could be used to dispense other liquids into containers for chilled storage, heated storage, or storage at ambient conditions. The containers may be movable, as shown herein, or may be secured in fixed positions, and not typically movable.

In the particular illustrated embodiment of the invention shown in FIG. 1, a system is provided for providing a supply of chilled liquid which comprises a refrigerator cabinet 22 having a refrigerated storage area 24 and a door 26 for accessing the refrigerated storage area, a serving vessel or container 28 removably located within the refrigerated storage area, an optical sensor 30 positioned relative to the serving vessel to detect the presence of the vessel and a level of liquid in the vessel, and a fluid supply system 32 providing the liquid to the serving vessel via a dispenser 34 located in the storage area in response to an output from the optical sensor. As shown in this particular embodiment, the container 28 may be positioned in an interior surface area of the door 26 of the refrigerator 20, or it may be positioned on a shelf or other receptacle in a different location within the refrigerated storage area 24. In other embodiments of the invention not utilizing a refrigerator, the container 28 need not be positioned in an enclosed space.

The remaining figures illustrate components of the system which could be used in environments other than in a refrigerator, as well as in a refrigerator.

Figure 6:
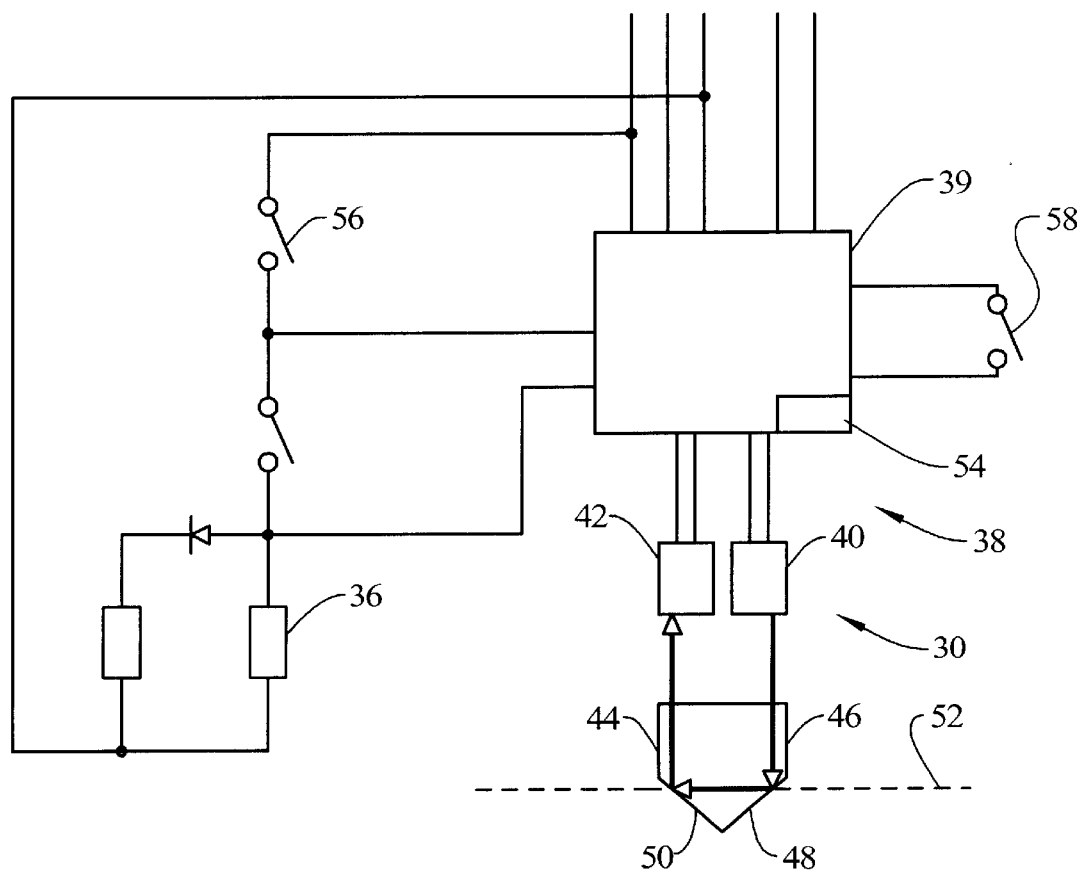
FIG. 6 is an electrical schematic of a control which may be used with the present invention.

The system would include a liquid supply line, such as 32, which may include a filter 33, and the liquid container 28, the liquid dispenser 34, which may be an open end of the supply line 32, positioned to deliver a supply of liquid to the container from the liquid supply line and a valve 36 (FIG. 6) positioned in the liquid supply line 32 to selectively deliver liquid to the liquid dispenser 34. A control circuit 38 is provided connecting the optical sensor 30 to the valve 36 to open the valve when the sensor 30 detects the presence of the container 28 and a level of liquid below a maximum desired liquid level in the container and to close the valve when the sensor detects at least one of the absence of the container and a maximum desired liquid level in the container.

Figure 4:
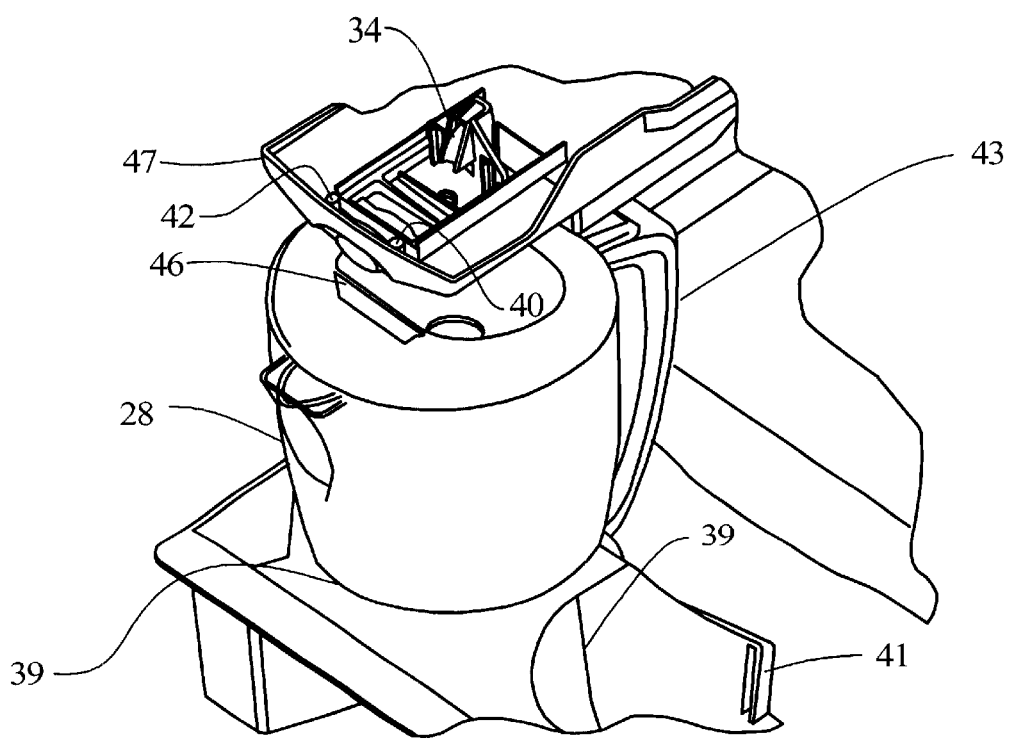
FIG. 4 is a top perspective view of the container held in the receptacle and with portions of the dispenser housing illustrated.

In an embodiment, the container 28 is received in a receptacle 39 which has a shape to receive the container in a unique position, such as by having a cut-out 41 for receiving a handle 43 of the container. FIG. 4 illustrates two such receptacles 39 positioned side-by-side allowing for a plurality of containers to be held. Other unique position arrangements, such as the geometrical shape of the receptacle, a recess in the receptacle or the container for receiving a projection on the other of the container or receptacle, or other similar arrangements could be used. In this way, the exact position of the container 28 relative to the dispenser 34 and the sensor 30 can be maintained.

In an embodiment of the invention, the optical sensor 30 comprises a control electronics 39 with a light emitting diode 40 and a light receiving device 42 located outside of the container 28 and a reflector 44 located inside of the container. In such an embodiment, the reflector 44 comprises a prism 46 with reflecting surfaces 48, 50 positioned at a level associated with a maximum desired liquid level 52 in the container or vessel 28. In the embodiment illustrated, the prism 46 is held in a lid 45 of the container 28, with the lid being held on the container in a unique position so that the exact position of the prism can be maintained relative to the sensor 30 when the container is positioned in the receptacle 39. The height of the prism 46 in the container 28 is arranged so that the reflecting surfaces 48, 50 will be submerged in the liquid just as the liquid reaches the maximum desired level 52.

In an embodiment of the invention, the infrared LED 40, located in a housing 47 of the dispenser 34, upon operation of the control electronics 39, pulses an IR beam which travels through the prism 46 and is reflected to the infrared LED receiver 42 located in the dispenser housing 47. When the liquid level is below the prism 46, light is reflected at the prism to air boundary, received by the receiver 42, which in turn holds the valve 36 open, dispensing the liquid. When the liquid level reaches the prism 46, the light no longer "sees" a reflection boundary (the index of refraction for the prism material and the liquid are very close to the same value). Since there is no reflection, the light signal is lost by the receiver 42, closing the valve 36.

In a similar manner, the sensor 30 detects the presence or absence of the container 28. That is, if the container is absent, when the control electronics 39 pulses the IR beam from the LED 40, that beam is not reflected to be picked up by the receiver 42 and the valve 36 will be maintained in the closed position. Only when the container 28 is properly positioned (with a liquid level below the "full" level 52) will the sensor 30 detect the presence of the container and allow valve 36 to open.

Thus, the "failure" mode for the sensor system, the non-receipt of reflected light or non-recognition of the receipt of the reflected light is to maintain the valve 36 in the closed position to prevent unwanted dispensing of water.

In an embodiment of the invention, in order to reduce the likelihood of false activation of the sensor from extraneous light sources, the infrared light is modulated by the control electronics 39 prior to transmission. The receiver 42 will not activate unless the received light is synchronized at the same rate as the transmitted light.

Figure 5:
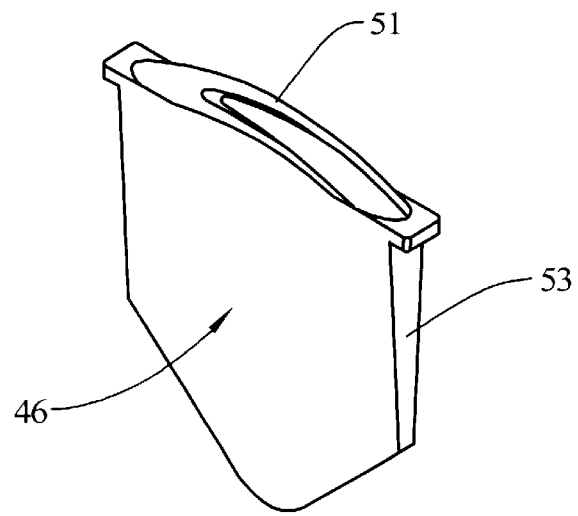
FIG. 5 is a perspective view of a prism which may be used in an embodiment of the invention, shown in isolation.

In an embodiment of the invention where the container 28 is located in a door, such as the door 26 of the refrigerator 20, or some other movable receptacle, the prism 46 may be designed to accommodate a significant variation in the door assembly, while still quickly triggering "off" when the door is opened. As shown in FIG. 5, a top surface 51 of the prism 46 may be rounded to focus light into the prism and disperse the light when it exits the prism. Additionally the sides 53 of the prism may be tapered to allow for a thinner prism design. The prism shape, as shown, is also "water shedding" which prevents droplets of water from collecting on the reflecting surfaces of the prism 46 and which might thereby prevent the mechanism from operating correctly. Other water shedding shapes are contemplated by the present invention as well.

In an embodiment of the invention, the control circuit 38 includes a timer device 54 to permit an opening of the valve 36 for only a pre-determined length of time. As an example, the timer device 54 may permit the valve 36 to be opened only for the length of time necessary to fill the container 28 under normal filling rates. This would provide a "fail safe" method for preventing a continuous flow of liquid into the container 28, even after it had completely filled. Further, as an example, the timer device 54 may permit the valve 36 to be opened only following a certain event, such as the closing of the refrigerator door 26, again only for a predetermined length of time. Therefore, the filling process would not occur if the container 28 had not been accessed recently, that is, the door 26 to the refrigerator 20 had not been opened and closed recently.

In an embodiment of the invention, at least one sensor 30 is positioned relative to the container 28 to detect the presence of the container and a level of liquid in the container. Also, the control circuit 38 is provided which connects the at least one sensor 30 and the valve 36 to open the valve when at least one sensor detects the presence of the container 28 and a level of liquid below a maximum desired liquid level in the container and to close the valve when the at least one sensor detects at least one of the absence of the container and a maximum of desired liquid level in the container, and wherein the control circuit includes the timer device 54 to permit an opening of the valve 36 for only a predetermined length of time. As an example, if the container 28 is positioned in a door or other movable receptacle, a sensor, which may be in the form of a switch 56, may detect whether the door is opened or the receptacle is moved relative to the dispenser, thereby preventing an opening of the valve 36. Another sensor, which could be in the form of a weight sensor or float, may be utilized to detect the level of liquid in the container 28. Of course, when using the prism arrangement, both functions are provided by a single sensor.

In an embodiment of the invention, another switch 58 may be provided to allow the user to manually disable the automatic self-filling operation of the system and a dispenser switch 60 may be provided to allow the user to manually open the valve 36.

In the embodiment described above, where the container 28 is located in the door of the refrigerator, the use of a remote sensor 30 as disclosed maximizes reliability of the automatic filling function while minimizing costs by avoiding the requirement of routing wires into the door 26 of the refrigerator 20.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A liquid dispenser and self-filling container system, comprising:
    a liquid supply line,
    a liquid container,
    a liquid dispenser positioned to deliver a supply of liquid to said container from said liquid supply line,
    a valve positioned in said liquid supply line to selectively deliver liquid to said liquid dispenser,
    an optical sensor comprises comprising a light emitting device and a light receiving device located outside of said container and a reflector located inside of said container for detecting the presence of said container and a level of liquid in said container,
    a control circuit connecting said optical sensor and said valve to open said valve when said sensor detects the presence of said container and a level of liquid below a maximum desired liquid level in said container and to close said valve when said sensor detects at least one of the absence of said container and a maximum desired liquid level in said container.

2. A liquid dispenser and self-filling container system according to claim 1, wherein said liquid is water.

3. A liquid dispenser and self-filling container system according to claim 1, wherein said container is movable.

4. A liquid dispenser and self-filling container system according to claim 1, wherein said liquid dispenser comprises an open end of said liquid supply line.

5. A liquid dispenser and self-filling container system according to claim 1, wherein said reflector comprises a prism with reflecting surfaces positioned at a level associated with said maximum desired liquid level.

6. A liquid dispenser and self-filling container system according to claim 1, wherein said control circuit includes a timer device to permit an opening of said valve for only a predetermined length of time.

7. A liquid dispenser and self-filling container system according to claim 1, wherein said self-filling container is a portable liquid dispenser.

8. A system for providing a supply of chilled fluid, comprising:
    a refrigerator cabinet having a refrigerated storage area and a door for accessing said refrigerated storage area,
    a serving vessel removably located within said refrigerated storage area,
    an optical sensor positioned relative to said serving vessel to detect the presence of said vessel and a level of fluid in said vessel, and
    a fluid supply system providing said fluid to said serving vessel via a dispenser located in said storage area in response to an output from said optical sensor.

9. A system according to claim 8, wherein said serving vessel is removably supported on an interior surface of said door.

10. A system according to claim 8, wherein said optical sensor comprises a light emitting device and a light receiving device located outside of said container and a reflector located inside of said container.

11. A system according to claim 10, wherein said reflector comprises a prism with reflecting surfaces positioned at a level associated with said maximum desired liquid level.

12. A system according to claim 8, wherein said control circuit includes a timer device to permit an opening of said valve for only a predetermined length of time.

13. A system according to claim 12, wherein said control circuit further comprises a door opening sensor and said timer device is activated when said door opening sensor detects an opening and subsequent closing of said door, and permits an opening of said valve for only a predetermined length of time following the detected closing of said door.

14. A system according to claim 8, wherein said fluid is water and said fluid supply system comprises a water supply source and a water conduit directing said water from said water supply source to said dispenser.

15. A liquid dispenser and self-filling container system, comprising:
    a liquid supply line,
    a liquid container,
    a liquid dispenser positioned to deliver a supply of liquid to said container from said liquid supply line,
    a valve positioned in said liquid supply line to selectively deliver liquid to said liquid dispenser,
    one or more sensors positioned relative to said liquid container to detect the presence of said container and a level of liquid in said container,
    a control circuit connecting said one or more sensors and said valve to open said valve when at least one of said sensors detects the presence of said container and a level of liquid below a maximum desired liquid level in said container and to close said valve when at least one of said sensors detects at least one of the absence of said container and a maximum desired liquid level in said container, and wherein said control circuit includes a timer device to permit an opening of said valve for only a predetermined length of time.

16. A liquid dispenser and self-filling container system according to claim 15, wherein said container is held in a door movable relative to said liquid dispenser and one sensor is provided to detect whether said door is moved and another sensor is provided to detect said level of liquid in said container.

17. A liquid dispenser and self-filling container system according to claim 15, wherein said timer device permits an opening of said valve for a period of time approximately equal to a time required by said liquid dispenser to fill said container.

18. A liquid dispenser and self-filling container system according to claim 15, wherein a single sensor detects both said presence of said container and said level of liquid in said container.

19. A liquid dispenser and self-filling container system according to claim 15, wherein said one or more sensors comprises an optical sensor.

\* \* \* \* \*